3,352,756
ARRANGEMENTS FOR CLOSING PENETRATIONS IN THE WALLS OF REACTOR PRESSURE CONTAINING STRUCTURES
George Edward Lockett and Geoffrey Coast, Dorchester, England, Michel Coudray and Pierre Vitry, Paris, France, and Enea Torielli, Milan, Italy, assignors to United Kingdom Atomic Energy Authority, London, England
Filed Mar. 22, 1965, Ser. No. 441,726
Claims priority, application Great Britain, Apr. 7, 1964, 14,387/64
9 Claims. (Cl. 176—40)

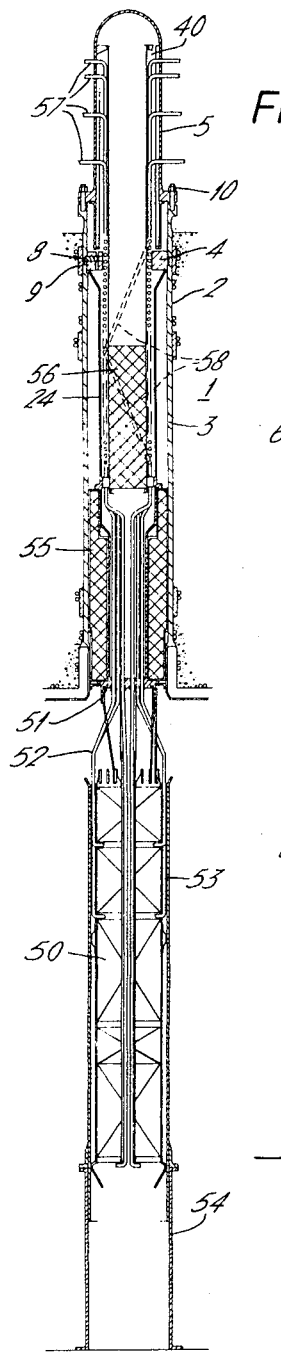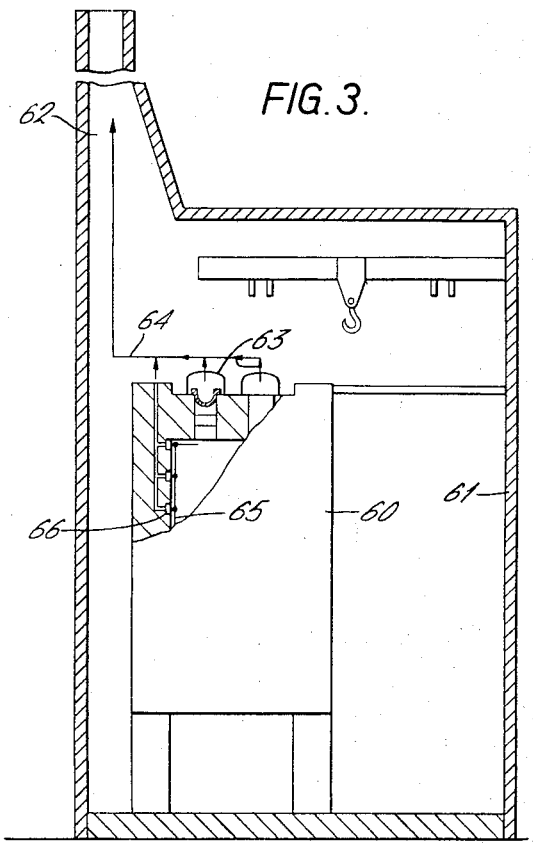

This invention relates to process plant and plant installations which include pressure containing structures, containing fluids at pressures higher than atmospheric. The invention mainly relates to arrangements for closing penetrations in the wall of said structures. One form of plant with which the invention is concerned is a nuclear reactor plant wherein the pressure containing structure is a pressure vessel enclosing a nuclear reactor.

Much attention has been directed to the design of closure devices for pressure vessel penetrations with the object of minimizing both the risk of actual fracture and the deleterious effects of such a fracture should it occur. In the case of pressure vessels housing nuclear reactors for example, provision has been made for surrounding the pressure vessel by one or more buildings or structures generally referred to as an outer containment whose function it is to form a barrier between a possible fractured pressure vessel and the surrounding atmosphere. The outer containment is normally made sufficiently strong to maintain its integrity in the event of an unforseen pressure excursion, as a result of vessel fracture and should also withstand damage due to plant accessories normally fixed within the vessel but which under the effects of a pressure vessel burst might be detached and become projectiles. The need for such a strong outer containment inevitably affects adversely the capital cost of a reactor installation and it is an object of the present invention to provide an improved closure device for a pressure vessel penetration which will, if need be, allow a reduction in the strength of the outer containment to be made without impairing the safe operation of the plant.

According to the present invention a closure device for a pressure vessel penetration comprises two closure members, mounting means for mounting the members in series, one behind the other, to close a vessel penetration, and forming inner and outer closure members with respect to the vessel interior, the inner of said members co-operating with its mounting means to form a closure against pressure excursion within the vessel and the outer member co-operating with its mounting means to form a sealed closure against the pressure difference contained by the pressure vessel.

The inner and outer member are preferably separated by an interspace which is allowed to assume a pressure equal to that contained by the pressure vessel. The outer member is preferably made as leak tight as possible against the design pressure difference whilst the inner member may be made as massive as may be thought desirable to withstand pressure excursions, but need only be sufficiently leak tight to delay intermingling of the vessel contents with the atmosphere on fracture of the outer member. Hence accidental failure of the outer member would not result in total and sudden pressure loss of pressure which, in the case of pressure vessel containing a pressure fluid serving as a nuclear reactor coolant, would represent a catastrophic loss of coolant.

In many instances penetrations of nuclear reactor pressure vessels may be conveniently arranged to give access to plant accessories such as valves, pumps, coolers, etc., and the present closure device is readily adaptable to function not only as a closure against catastrophic loss of coolant on failure of the seal formed by the outer member but also as a restraint means for the accessory to prevent its missile-like projection from the pressure vessel perhaps to damage the outer containment.

In order that the invention may be more fully understood one example of a closure device incorporating the invention will now be described by way of example. In the following, reference is made to the accompanying drawings in which:

FIG. 2 is a similar view to FIG. 1 and shows the closure device applied to a penetration giving access to a removable heat exchanger.

FIG. 3 shows the invention applied to a nuclear reactor installation and

Figure 1:
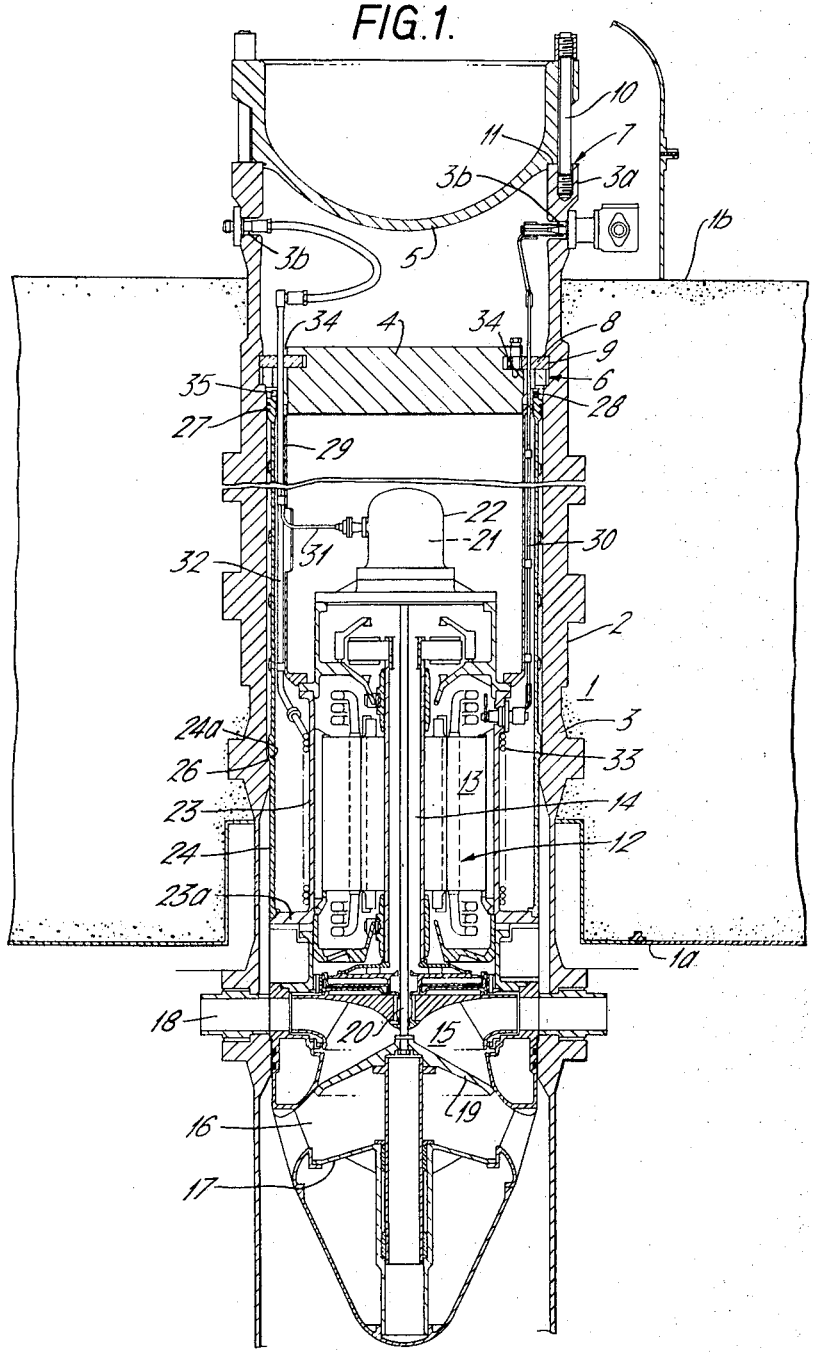
FIG. 1 shows a view in an axial cross-section through a penetration in the wall of a pressure vessel. The pressure vessel is one which encloses a gas coolant nuclear core and plant accessories and the penetration gives access to a gas circulator.

In FIG. 1 of the drawings the pressure vessel wall 1 is the top slab of a cylindrical prestressed concrete pressure vessel. The penetration is a hole indicated at 2 which penetrates the wall from its inner face 1a adjacent contained high pressure reactor coolant gas to its outer face 1b adjacent atmosphere, and is lined by a steel shutter tube 3. The closure device for the penetration comprises inner and outer members 4, 5 mounted in series one behind the other to close the penetration of which the inner member 4 co-operates with mounting means 6 in the shutter tube 3 and the outer member 5 co-operates with mounting means 7 to form a sealed closure against the pressure difference contained by the vessel. The inner member 4 is a massive plate positively locked to the tube 3 by releasable and extendable dogs or lugs 8 which can be locked in their extended position, and which enter undercut groove 9 in the tube but is not leak tight.

The outer member 5 is a concave plate fixed by an annular row of studs 10 to the top rim of a part 3a of the shutter tube 3 which protrudes beyond the outer face 1b of the pressure vessel wall. The studs 10 are disposed around a gasket seal 11 between the abutting faces which ensures a leak tight joint.

The inner member 4 cooperates with its mounting and a dependent bearing tube 24 to form a flow restrictor. Sealing rings 27 between the tube 24 and the shutter tube 3 enable the amount of flow to be controlled by whatever flow path is deliberately provided so that the rate of coolant escape in the event of failure of the outer member 5 or its mounting permits reactor shutdown and emergency cooling to obviate further hazards. The presence of the inner member 4 reduces the rate of flow which is thus less prone to convert plant accessories into projectiles. The inner member 4 and its mounting are of course robust enough to withstand any transient pressures in the pressure vessel and also to restrain the bearing tube 24 against ejection.

In this example, the inner member 4 also serves as a restraint means for a coolant circulator 12 to which the penetration affords access and which could be expelled through the penetration as a missile under extreme accident conditions if not restrained.

The circulator 12 comprises an electric motor 13, motor shaft 14, and fan 15, reactor coolant being drawn through the inlet passages 16 in fairing structure 17 through the fan 15 and delivered through outlet passages 18.

Passages 16, 18 are part of the reactor coolant primary circuit which may be of conventional form and the flow between them is controlled by a valve 19 operable by a spindle 20 extending coaxially within the shaft 14 and through a motor armature where it protrudes and is operated by a rotary stepping motor 21 enclosed in casing 22.

The circulator 12 has a casing 23 to which the stepping motor casing 22 is attached. The casing 23 has a bottom flange 23a.

The circulator is supported from the shutter tube by way of the bearing tube 24 which is fixed at its lower end to bottom flange 23a and has an external shoulder 24a which rests on an internal shoulder 26 on the shutter tube. The engaging shoulder surfaces are tapered as shown. In this manner the circulator is supported. The upper end of the bearing tube 24 has a thickened wall portion in which sealing rings 27 are located to form a low efficiency seal against the face of the shutter tube.

At spaced intervals around the rim of the bearing tube 24 are supported a series of loading pads 28 composed of Belleville washers which are engaged by the inner member 4.

An inner tube 29 is fixed coaxially within, and spaced from, the bearing tube 24 and provides support for the services to the circulator. Shown on the drawing are the electrical leads 30, 31 for the motors 13, 21 and the cooling water supply pipe 32 for the motor cooling water which is circulated around the motor casing 23 in coil 33. The services pass through holes 34 in the member 4 and through penetrations 3b in the portion 3a of the shutter tube 3.

The inner member 4 is locked to the wall of the shutter tube by the extendable lugs or dogs 8 entering the recess 9 which are positioned such that the member 4 must be pressed down so compressing the loading pads 28 before they will engage in the recess.

A flow path is provided to equalize the pressure on the opposite sides of the member 4 in the form of bleed holes in the bearing tube 24 such that the sealing rings 27 are by-passed. Thus whether the pressure in the vessel is increasing or decreasing, the pressures on both side will tend to be equal. With increasing pressure this prevents the member 4 from being stressed and applies stress on the outer member 5 so that member 4 provides a reserve of back-up protection and with reducing pressure prevents a high pressure pocket of gas being trapped. The holes may incorporate valves that permit flow only if there is an appreciable pressure difference. Such a valve is shown diagrammatically in FIGURE 4 at 35'.

From the foregoing it will be appreciated that in the event of fracture of the outer closure member 5, the leakage of coolant from the pressure vessel will amount to that which passes the sealing rings 27 and that which bleeds through the holes 35. This represents a very slow leak rate and gives ample time for remedial measures to be taken before a serious loss of coolant results.

Moreover the massive nature of the inner member 4 enables it to serve as a restraint plate which will prevent the ejection of the circulator from the pressure vessel in the manner of a missile should, as is unlikely, an explosion occur within the vessel when, as explained above, the outer containment would otherwise have to withstand the impact of such possible missiles.

Figure 4:
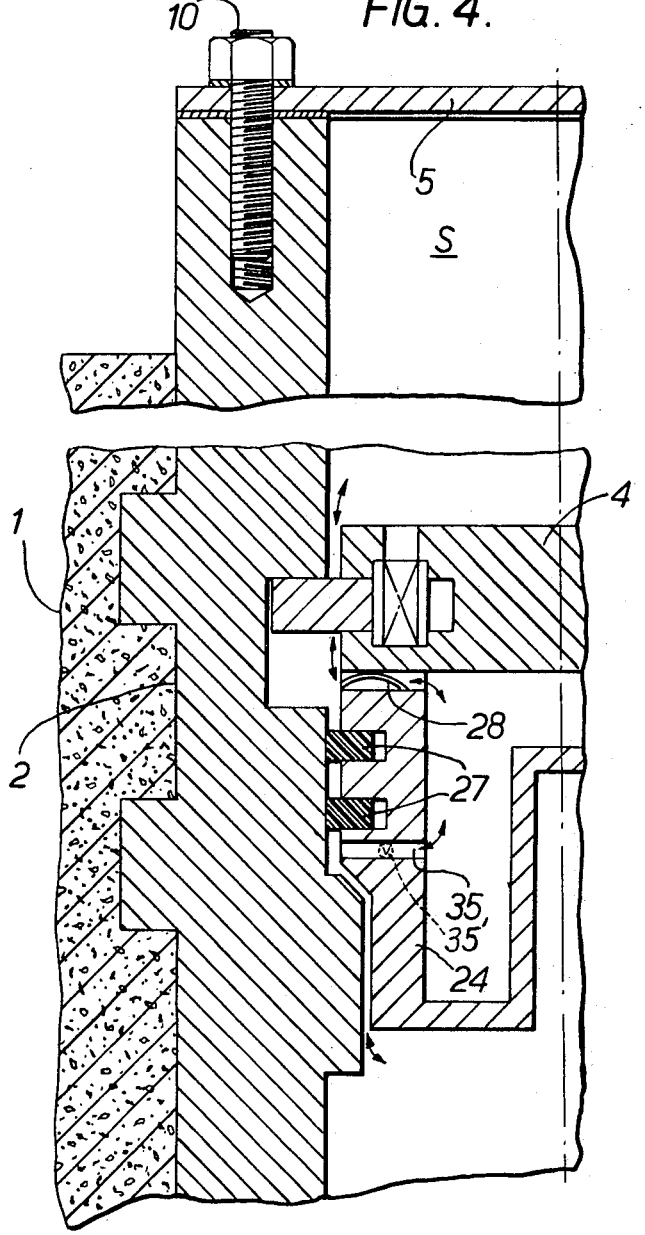
FIG. 4 shows an enlarged view of the closure device in one half axial cross-section.

FIG. 4 shows the parts of FIG. 1 adjacent the members 4 and 5 to a larger scale and with certain modifications for the sake of clarity. The bleed path is shown in FIG. 4 by arrows.

FIG. 2 shows a closure device constructed in a similar manner to that described with reference to FIG. 1 applied to a pressure vessel penetration which gives access to a removable heat exchanger—the closure also serving firstly as a means of preventing a catastrophic loss of coolant on failure and secondly as a restraint means for restraining the ejection of the heat exchanger as a missile under accident conditions, e.g., in the event of an explosion within the pressure vessel.

Parts in the arrangement shown in FIG. 2 which are similar to those in FIG. 1 are given the same reference numerals.

In FIGURE 2, the reference 1 indicates the top slab of concrete pressure vessel having a penetration hole 2 lined with a shutter tube 3.

The inner member 4 is a plate robust enough to act as a restraint plate for the heat exchanger 50 and is locked to the groove 9 in the shutter tube 3 by pivotal dogs 8. The outer closure member 5 is a domed plate having a flange which abuts the top rim of the shutter tube 3 and is secured thereto by studs 10 to give a leak tight joint against the full pressure the vessel is designed to withstand.

As before, the inner member 4, its mounting, and a dependent pressure thimble 24 form a flow restrictor. The inner member 4 is apertured to allow heat exchange inlet and outlet pipes and a central pipe to extend through it into the dependent thimble which carries at its lower end a tube plate 51 in which the pipes are a close fit and this is designed to delay loss of pressure in the event of a fracture of the outer member 5.

Below the plate 51, the pipes extend into the pressure vessel. The heat exchanger 50 is suspended from hangers 52 attached to the tube plate 51. The heat exchanger stages are arranged so as to be withdrawable through the penetration and are manifolded into the primary heating circuit by means of a shroud tube 53 enclosing the stages and capable of entering as a push fit into a manifold tube 54. Connections with other heat exchangers are made via similar manifold tubes 54 which all communicate with the primary heating fluid.

Complementary shielding plugs, one annular 55 and one cylindrical 56 are supported in the penetration by the pressure thimble 24 to allow adequate radiation shielding.

The flow and return pipes 57 for the heat exchanger 50 are led through sealed penetrations in the domed plate 5 through the inner member 4 and then through the tube plate 51. Allowance for expansion and contraction of these pipes between the tube plate 51 and the outer closure member is catered for by a helical turn 58.

The form of penetration closure and restraint means described leads to a simplified form of containment design for pressure vessels. As shown in FIG. 3 the pressure vessel 60 may be enclosed in an envelope 61 of light construction and having a stack 62. Each of the outer closure members in the pressure vessel top slab 1 is hooded by a bonnet 63 and the interior of each of these is connected by pipes 64 with the stack 62 as also is the interior of the envelope 61.

Other parts where leakage from the pressure vessel is likely are also made to communicate on their low pressure side with the stack. For example the seal welds joining the pressure vessel membrane 65 are conveniently each formed with a channel 66 on their low pressure sides and these channels communicate with the stack 62.

Whilst in the two embodiments of the invention described with reference to FIGS. 1 and 2, the inner member 4 has been employed as a restraint means for a component to which the penetration gives access, the closure means, i.e., the inner and outer closure members may be used to close a penetration which is designed merely to give access to the interior of the vessel. In this latter case the bearing tube 24 is omitted and the inner closure member, although not leak tight as stated above, is sufficiently good a seal as to delay the loss of coolant (or entry of atmospheric air) in the event of a pressure rise within the vessel breaking the outer closure member. This delay gives time to bring into play emergency measures, such as emergency cooling or gas blanketing of the pressure vessel internals.

We claim:

1. In combination with a nuclear reactor pressure vessel having a penetration through the pressure vessel wall to permit removal of a plant component within the pressure vessel, a nuclear reactor pressure vessel penetration closure device comprising: an outer closure member, mounting means for removably mounting said outer closure member onto the pressure vessel to close off the said penetration, and a leak tight seal operatively associated with said outer closure member so that the said mounting means and the said leak tight seal seal off pressure differences within the vessel and a massive non-sealing inner removable closing member, second mounting means for mounting and locking said inner member inwardly of said outer member and forming an interspace therebetween, the inner member having means associated therewith non-sealably connected to the pressure vessel wall, a passageway in the last said means for restricting the flow of fluid from the pressure vessel to the interspace, said passageway including means for allowing pressure fluid to flow from said vessel to said interspace and for limiting the flow through the restrictor upon failure of the outer closure member.

2. An apparatus according to claim 1 wherein the inner member is apertured to allow a controlled flow through the closure device in the event of failure of the first closure member.

3. An apparatus according to claim 1 wherein releasable dogs are incorporated in and extendable from the inner member and wherein the second mounting means includes recesses into which the dogs can be extended.

4. An apparatus according to claim 1 having a plant accessory mounted for withdrawal through the penetration and also having means attaching the accessory to the second member to restrain the accessory from ejection through the penetration.

5. Apparatus as claimed in claim 1 further comprising an outer envelope surrounding said nuclear reactor pressure vessel, said outer envelope being vented by a stack and incorporating hoods that fit over said closure device to conduct to the stack the limited flow that would occur upon failure of said first member, together with all other possible leakage.

6. An apparatus according to claim 2 wherein a valve is incorporated in the inner member so that the controlled flow only occurs if the pressure causing it exceeds a set value.

7. An apparatus according to claim 4 in which the accessory is a coolant circulator.

8. An apparatus according to claim 4 in which the accessory is a heat exchanger.

9. An apparatus according to claim 4 in which the attaching means are coaxial sleeves.

References Cited

UNITED STATES PATENTS

| | | | |
|---|---|---|---|
| 2,198,125 | 4/1940 | Nelson | 220—29 |
| 2,920,789 | 1/1960 | Tinker | 220—29 X |
| 2,995,505 | 8/1961 | Guild | 176—87 X |
| 3,014,856 | 12/1961 | Nicklas | 176—87 X |
| 3,022,238 | 2/1962 | Kolflat | 176—87 |
| 3,124,516 | 3/1964 | Le Flem et al. | 176—87 |
| 3,234,102 | 2/1966 | Brown et al. | 176—87 X |

FOREIGN PATENTS

| | | |
|---|---|---|
| 1,269,100 | 7/1961 | France. |
| 1,279,425 | 11/1961 | France. |

REUBEN EPSTEIN, *Primary Examiner.*